UNITED STATES PATENT OFFICE.

CALVIN TOMKINS, OF NEW YORK, N. Y.

PROCESS OF MANUFACTURING CEMENT.

SPECIFICATION forming part of Letters Patent No. 465,330, dated December 15, 1891.

Application filed April 6, 1891. Serial No. 387,837. (No specimens.)

*To all whom it may concern:*

Be it known that I, CALVIN TOMKINS, a citizen of the United States, and a resident of the city of New York, county and State of New York, have invented certain new and useful Improvements in Processes for Manufacturing Cement, of which the following is such a full, clear, concise, and exact description as will enable others skilled in the art to which my invention appertains to make and use the same.

The object of my invention is the development of an improved process for utilizing slag as an ingredient in the manufacture of cement or plaster, the elimination of the most expensive steps heretofore generally followed, and the production of a composition for a strong durable cement that can be placed upon the market at a comparatively low figure. In such a composition the slag should be purified, finely divided, and, what is of great importance in securing tensile strength, in intimate relation or union with the lime which forms a component part in all these cements. To effect this union, the slag, having been ground after it has cooled, has been mixed with lime, again reheated, cooled, and reduced to a powder. Quicklime in mass has been added to the molten slag, and then the mixture or combination cooled and pulverized, and methods and apparatus have also been devised for removing the slag into a second cupola, and, while maintaining it at a high temperature, injecting therein the lime in a finely-divided state by means of hot-air blasts. Without considering all the disadvantages of such methods, it is apparent that any process that involves continued heating or reheating of the slag adds a serious item to the cost of production.

In carrying out my improved process, the slag as it is withdrawn from the furnace, and before cooling, is precipitated into a bath of hydrate of lime. This bath can be prepared in any suitable vessel, and may be either a pure solution, lime-water, or a milk of lime, depending upon the uses for which the cement is intended. After this mass is thoroughly dried out it is reduced to a powder and placed in packages, ready for shipment.

While slag has been previously dropped in plain water for the purpose of purifying it, as well as rendering it brittle and more easily crushed, by substituting for fresh water lime-water or milk of lime additional advantages are attained, a further purifying effect is secured, while, the lime in solution or suspension coming in contact and permeating the heated metal, a more intimate and homogeneous union is brought about between the two elements than can be accomplished by any mixture or intermingling of the lime and slag when both are at normal temperatures. By thus subjecting the molten slag to a bath of hydrate of lime no further heating is necessary, except what may be applied to hasten the drying. More lime may be added, if desired, and sand may be mixed in, and also any of the various animal, vegetable, or mineral fibers, as well as such coloring-matters as have heretofore been used in plasters and cements.

Having thus described my invention, what I claim as new, and desire to secure by Letters Patent, is—

An improved process in manufacturing cement, which consists in subjecting highly-heated slag as it comes from the furnace, and before it has been allowed to cool, to a bath of hydrate of lime, and drying and pulverizing the same, substantially as described.

CALVIN TOMKINS.

Witnesses:
L. HAZARD BUDDECKE,
I. F. MCCORMACK.